J. F. DURYEA.
STEERING WHEEL CONSTRUCTION FOR AUTOMOBILES.
APPLICATION FILED JAN. 27, 1913.
1,130,263.
Patented Mar. 2, 1915.
3 SHEETS—SHEET 1.
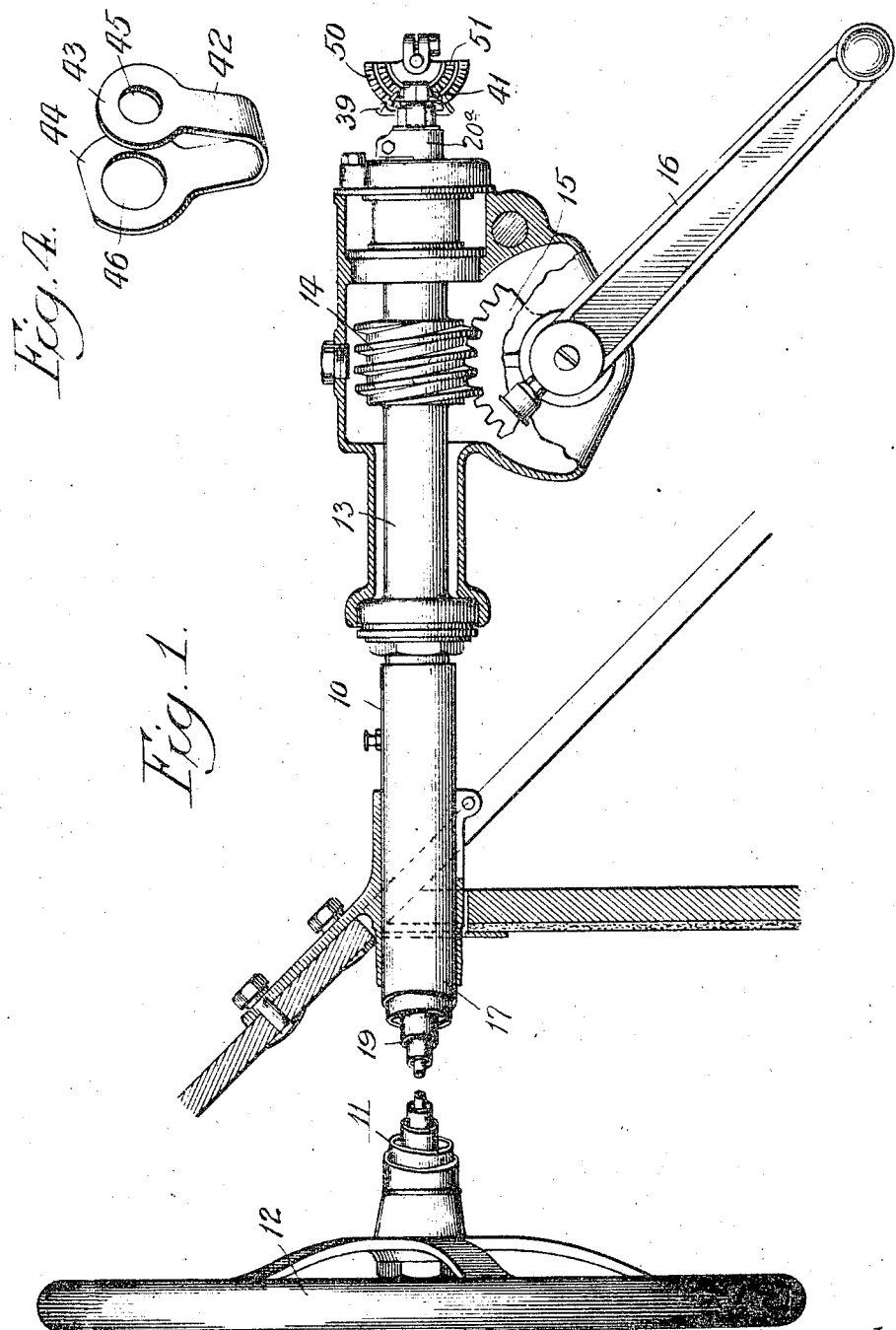
Witnesses:
John Enders
Henry A. Paris
Inventor:
James F. Duryea,
by Sheridan, Wilkinson, Scott & Richmond
Attys

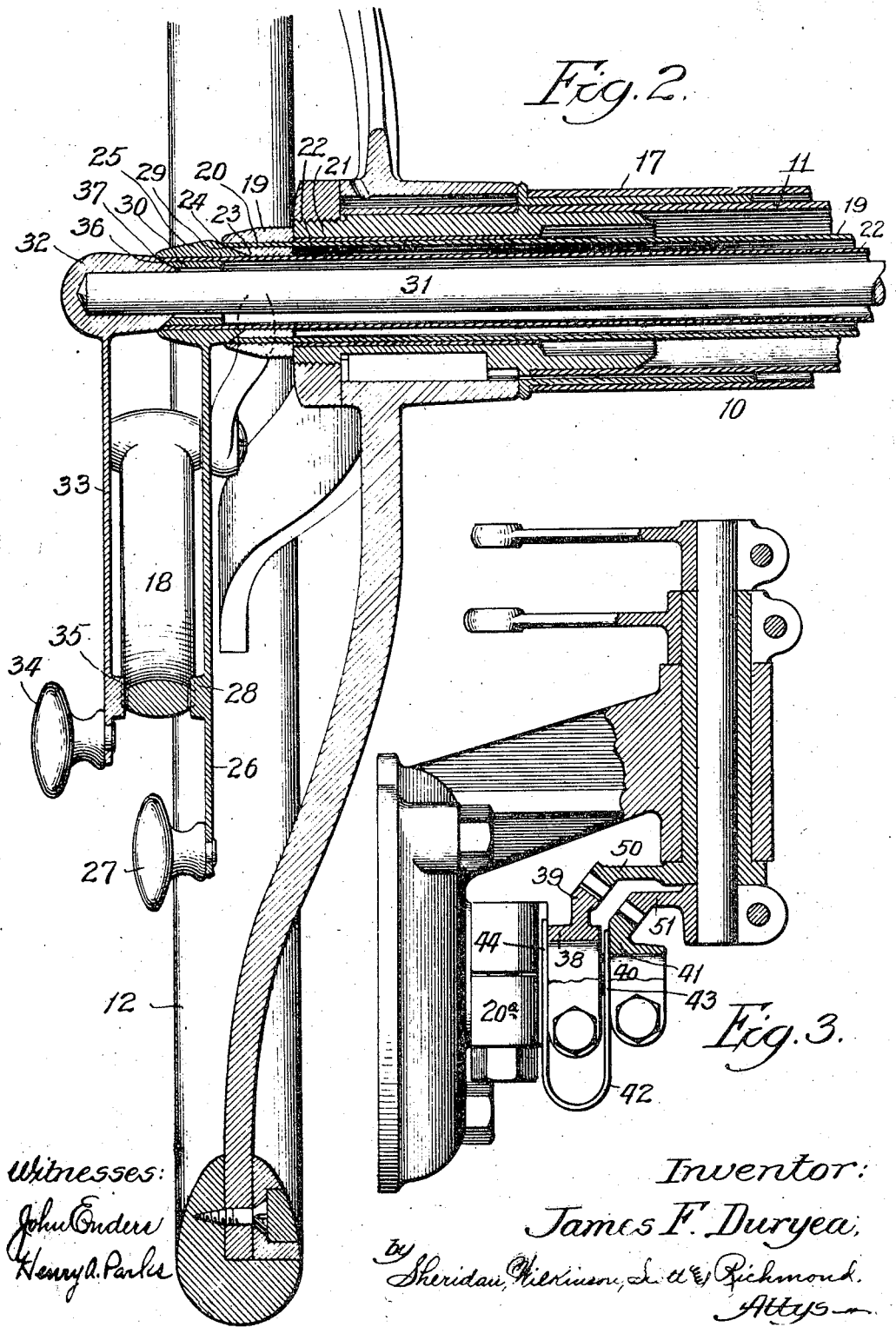

J. F. DURYEA.
STEERING WHEEL CONSTRUCTION FOR AUTOMOBILES.
APPLICATION FILED JAN. 27, 1913.
1,130,263.
Patented Mar. 2, 1915.
3 SHEETS—SHEET 3.
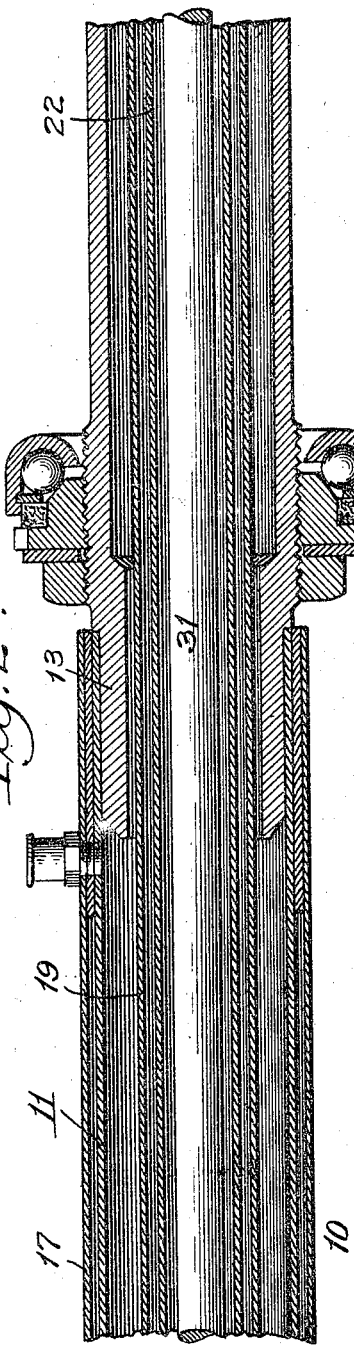
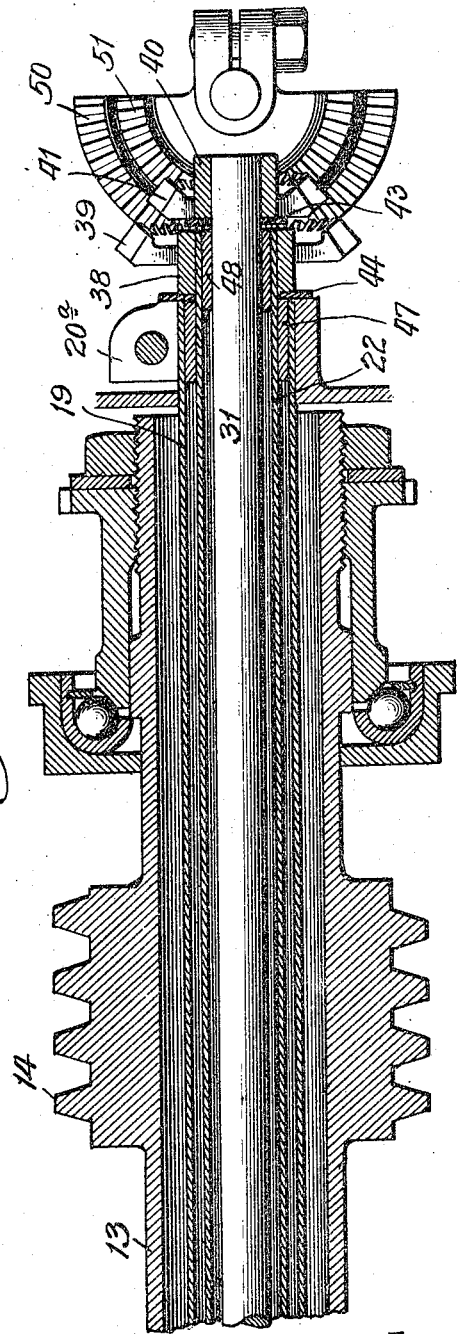
Witnesses:
John Enders
Henry A. Parks
Inventor:
James F. Duryea,
by Sheridan, Wilkinson, Scott & Richmond
Attys.

UNITED STATES PATENT OFFICE.

JAMES F. DURYEA, OF SPRINGFIELD, MASSACHUSETTS, ASSIGNOR TO STEVENS-DURYEA COMPANY, OF CHICOPEE FALLS, MASSACHUSETTS, A CORPORATION OF MASSACHUSETTS.

STEERING-WHEEL CONSTRUCTION FOR AUTOMOBILES.

1,130,263.  Specification of Letters Patent.  Patented Mar. 2, 1915.

Application filed January 27, 1913. Serial No. 744,435.

*To all whom it may concern:*

Be it known that I, JAMES F. DURYEA, a citizen of the United States, residing at Springfield, in the county of Hampden and State of Massachusetts, have invented certain new and useful Improvements in Steering-Wheel Construction for Automobiles, of which the following is a specification.

This invention relates to improvements in steering wheel construction for use with motor vehicles and has for its object to provide an improved form of steering wheel construction embodying the engine controls therein.

Another object of this invention is to provide an improved form of steering wheel in which are contained the throttle and spark controlling means for a gas engine. It has been found in the present-day construction of similar devices that where the spark control rod and throttle control sleeve surrounding the latter and spaced therefrom are located in the steering column a certain amount of wear takes place so as to cause rattling and jarring and other difficulties. My invention aims to eliminate these troubles and to provide an improved means for adjustment of the bearing surfaces of these devices, and means to automatically take up any wear occurring.

Other objects will be made apparent and set forth in the following specification and accompanying drawings, in which—

Figure 1 is a side elevation partially in section showing the steering wheel embodying my invention. Fig. 2 is a longitudinal section through the steering column showing the controlling member. Fig. 2ª is a continuation of Fig. 2. Fig. 2ᵇ is a continuation of Fig. 2ª. Fig. 3 is a side elevation partially in section of a detail of the controlling devices. Fig. 4 is a perspective of the spring clip member.

Like numerals refer to like elements throughout the drawings, in which 10 designates generally my steering column having the sleeve 11 carrying at one extremity the usual form of steering wheel indicated by numeral 12 and secured at its opposite extremity to the sleeve 13 carrying the screw 14 meshing with the sector 15, which in turn is connected to the steering knuckle 16. This construction forms no part of my present invention and it is not necessary to further describe the same. An external protecting casing 17 is located around the entire steering column.

Carried adjacent to the steering wheel is the notched quadrant 18 carried by what I term the fixed sleeve 19. Located at the top is the collar 20 secured to the outer portion thereof and resting upon a fixed casing member 21. This collar 20 serves to maintain the fixed sleeve securely at the top of the steering column. The rotatable sleeve 22 is located within the fixed sleeve 19 and is spaced therefrom by the bearing collar 23 at the upper portion thereof. This bearing collar is provided with a tapered socket or inclined upper portion indicated by numeral 24 for a purpose to be hereinafter described.

The rotatable sleeve 22 is provided with the collar 25 from which projects the operating lever 26 terminating in the button 27 and provided with an upwardly extending shoulder 28 adapted to seat in notches in the quadrant 18. This bearing collar 25 is conically tapered, as indicated by numeral 29, to closely fit in the tapered socket 24 of bearing collar 23 and it is brazed or otherwise suitably secured to the upper extremity of the rotatable sleeve 22.

Located within the sleeve 22 and spaced therefrom by the bearing collar 30 is the rotatable rod 31 carrying at its upper extremity a cap bearing 32 from which projects the operating lever 33 terminating in the button 34 and provided with the downwardly projecting shoulder 35 adapted to seat in notches in the quadrant 18. This bearing cap 32 is provided with a tapered conical lower portion 36 fitting in a similarly tapered socket 37 at the upper portion of bearing collar 30. At the opposite end of the rotatable sleeve 22 is mounted the hub 38 of the bevel gear 39. At the adjacent extremity of the fixed sleeve 19 is located the clamped collar 20ª serving to hold the same securely in place. At the lower extremity of the rotatable rod 31, which projects through the rotatable sleeve 22, is secured the hub 40 carrying the smaller bevel gear 41. It will be noted that the rotatable sleeve 22 projects a slight distance through and beyond the fixed sleeve 19 and the rod 31 similarly projects through and beyond the rotatable sleeve 22.

A U-shaped clip or spring 42 (see Fig. 4)

is provided with the enlarged extremities 43, 44 apertured as indicated by numerals 45 and 46, respectively. The aperture 45 fits over the rod 31 and the enlarged extremity 43 abuts against the hub 40. The aperture 46 similarly fits over the rotatable sleeve 22 and the enlarged end 44 abuts against the extremity of the fixed sleeve 19, the rotatable sleeve being spaced therefrom by the collar 47. The collar 48 serves to space the extremity of the rod 31 from the rotatable sleeve 22, as shown in Fig. 2ᵇ. The U-shaped clip 42 being formed of spring metal and compressed when shown in the position indicated in Fig. 2ᵇ will act to draw rod 31 downwardly with respect to fixed sleeve 19, as will be apparent. This operates to draw the tapered bearing surface 37 of cap 32 against the inclined surface 36 of socket portion of bearing collar 30, which further operates to draw or press the inclined or tapered surface 29 of collar 25 against the inclined or tapered wall of socket 24 of bearing collar 23.

It will be apparent that I have provided a bearing surface for the cap 32 and thereby have provided for journaling the rotatable rod 31 in a position spaced from the rotatable sleeve 22 and similarly I have journaled the rotatable sleeve 22 and spaced the same from the fixed sleeve 19. These bearing surfaces being inclined as shown and the action of the U-shaped clip being constantly exerted, it will be apparent that as wear takes place on the inclined bearing surfaces they will be still drawn together and the wedging action that results will serve to keep the bearing surfaces effectually in contact and will serve to keep the rod and sleeves in proper spaced relation. It is to be noted that the bevel gear 39 is in mesh with the toothed segment 50, and bevel gear 41 is in engagement with toothed segment 51, these segments being connected respectively to a carbureter control and spark control or vice versa as desired.

While I have shown and described my improved device with more or less particularity, I do not wish to be restricted to such showing beyond the scope of the appended claims.

I claim:

1. In a device of the class described, a steering column comprising a fixed sleeve, a rotatable controlling member located in said sleeve and spaced therefrom, said controlling member being provided with a tapered bearing member, said fixed sleeve being provided with a collar bearing adapted to space said rotatable controlling member from said sleeve, said collar bearing being provided with a tapered socket, said tapered bearing member of said controlling member being adapted to fit in said tapered socket and rotate thereon.

2. In a device of the class described, a steering column comprising a fixed sleeve, a rotatable controlling member located in said sleeve and spaced therefrom, said controlling member being provided with a tapered bearing member, said fixed sleeve being provided with a collar bearing adapted to space said rotatable controlling member from said sleeve, said collar bearing being provided with a tapered socket, said tapered bearing member of said controlling member being adapted to fit in said tapered socket and rotate thereon, and means to maintain said bearing member in contact with said tapered socket.

3. In a device of the class described, a steering column comprising a fixed sleeve, a rotatable controlling member located in said sleeve and spaced therefrom, said controlling member being provided with a tapered bearing member, said fixed sleeve being provided with a collar bearing adapted to space said rotatable controlling member from said sleeve, said collar bearing being provided with a tapered socket, said tapered bearing member of said controlling member being adapted to fit in said tapered socket and rotate thereon, and means to maintain said bearing member in contact with said tapered socket, said means comprising a spring member adapted to coact with said sleeve and said controlling member to hold said controlling member rotatably seated in said sleeve member.

4. In a device of the class described, a steering column comprising a fixed sleeve, a rotatable controlling member located in said sleeve and spaced therefrom, said controlling member being provided with a tapered bearing member, said fixed sleeve being provided with a collar bearing adapted to space said rotatable controlling member from said sleeve, said collar bearing being provided with a tapered socket, said tapered bearing member of said controlling member being adapted to fit in said tapered socket and rotate thereon, and means to maintain said bearing member in contact with said tapered socket, said means comprising a spring member having an extremity coacting with the extremity of their fixed sleeve and having another extremity coacting with the extremity of said rotatable controlling member and adapted to move the latter away from the former to maintain said controlling member in position in said sleeve member.

5. In a device of the class described, a steering column comprising a fixed casing, a rotatable controlling member mounted in said casing and spaced therefrom, means to space said controlling member from said casing, said means being adapted to furnish a bearing for said rotatable controlling member, and means comprising a U-shaped clip for maintaining said controlling member in constantly uniform association with said first named means.

6. In a device of the class described, a steering column comprising a fixed sleeve, a rotatable controlling sleeve mounted in said sleeve and spaced therefrom, a rotatable controlling rod mounted in said rotatable sleeve and spaced therefrom, means to space said rotatable sleeve from said fixed sleeve, said means being adapted to furnish a constantly uniform bearing for said rotatable sleeve, means to space said rod from said rotatable sleeve, said second named means being adapted to furnish a constantly uniform bearing for said rotatable rod, and means to hold said rod and controlling sleeve in contact with their respective spacing and bearing means.

7. In a device of the class described, a steering column comprising a fixed sleeve, a rotatable controlling sleeve mounted in said casing, a rotatable controlling rod mounted in said controlling sleeve, a bearing collar carried by said fixed sleeve and serving to space said controlling sleeve therefrom, said bearing collar being provided with a tapered socket, said controlling sleeve being provided with a tapered bearing member adapted to seat in said tapered socket, said controlling sleeve being provided with a collar bearing, said last named bearing being provided with a tapered socket, said controlling rod being provided with a bearing member, said bearing member being provided with a tapered portion adapted to seat in said tapered socket of said controlling sleeve and collar bearing.

8. In a device of the class described, a steering column comprising a fixed sleeve, a rotatable controlling sleeve mounted in said casing, a rotatable controlling rod mounted in said controlling sleeve, a bearing collar carried by said fixed sleeve and serving to space said controlling sleeve therefrom, said bearing collar being provided with a tapered socket, said controlling sleeve being provided with a tapered bearing member adapted to seat in said tapered socket, said controlling sleeve being provided with a collar bearing, said last named bearing being provided with a tapered socket, said controlling rod being provided with a bearing member, said bearing member being provided with a tapered portion adapted to seat in said tapered socket of said controlling sleeve and collar bearing, and means to maintain said respective bearing members in constant contact with their respective tapered socket bearings.

9. In a device of the class described, a steering column comprising a fixed sleeve, a rotatable controlling sleeve mounted in said casing, a rotatable controlling rod mounted in said controlling sleeve, a bearing collar carried by said fixed sleeve and serving to space said controlling sleeve therefrom, said bearing collar being provided with a tapered socket, said controlling sleeve being provided with a tapered bearing member adapted to seat in said tapered socket, said controlling sleeve being provided with a collar bearing, said last named bearing being provided with a tapered socket, said controlling rod being provided with a bearing member, said bearing member being provided with a tapered portion adapted to seat in said tapered socket of said controlling sleeve and collar bearing, and means to maintain said respective bearing members in constant contact with their respective tapered socket bearings, said means comprising a U-shaped spring member having one extremity fitting over said controlling sleeve and abutting against an extremity of said fixed sleeve, said clip member being provided with another extremity to fit over said controlling rod and abut against the collar carried at the end thereof, said clip member being formed of spring material, the extremities thereof being adapted to normally separate.

In testimony whereof, I have subscribed my name.

JAMES F. DURYEA.

Witnesses:
  LILLIAN BEAUDIEAU,
  THOS. H. SHERIDAN.